United States Patent [19]

Laskody

[11] 4,003,249
[45] Jan. 18, 1977

[54] THRUST CORRELATED ENGINE PRESSURE RATIO INDICATOR AND METHOD FOR TURBOFAN ENGINES WITH MIXER-TYPE NOZZLES

[75] Inventor: Jerome R. Laskody, Bellevue, Wash.

[73] Assignee: The Boeing Company, Seattle, Wash.

[22] Filed: Dec. 29, 1975

[21] Appl. No.: 644,895

[52] U.S. Cl. .......................... 73/117.4; 73/407 PR
[51] Int. Cl.² ........................................ G01M 15/00
[58] Field of Search ................ 73/117.4, 407 PR; 235/150.2

[56] References Cited
UNITED STATES PATENTS

| | | | |
|---|---|---|---|
| 3,310,666 | 3/1967 | Millar et al. | 73/117.4 X |
| 3,837,220 | 9/1974 | McDonald et al. | 73/117.4 |
| 3,927,307 | 12/1975 | Reschak | 235/150.2 X |

Primary Examiner—Jerry W. Myracle
Attorney, Agent, or Firm—Christensen, O'Connor, Garrison & Havelka

[57] ABSTRACT

A pneumatic computing device is disclosed for use with turbofan engines having mixer-type nozzles, in which both turbine and fan discharge pressures are tapped and pneumatically combined to derive a pressure equal to a weighted average thereof for application along with engine inlet pressure to a ratio-taking computing indicator instrument that registers an engine pressure ratio (EPR) from which the level of thrust developed by the engine can be accurately determined.

6 Claims, 4 Drawing Figures

THRUST CORRELATED ENGINE PRESSURE RATIO INDICATOR AND METHOD FOR TURBOFAN ENGINES WITH MIXER-TYPE NOZZLES

BACKGROUND OF THE INVENTION

The present invention relates to a novel method and apparatus for accurately measuring and indicating the thrust developed by turbofan jet engines of a type for which conventional EPR computing indicators do not develop pressure ratio measurements that are consistently and reliably correlated to the level of thrust. Namely, the type of engine with which the invention is concerned is low exhaust noise turbofans wherein the turbine and fan discharges are combined in a mixer being discharged from the engine nozzle.

With conventional turbojets and nonmixer turbofans, existing EPR measuring indicators yield results that consistently and accurately indicate the level of developed thrust, from engine to engine of a production run (after calibration on a test engine of the same type and model). Such indicators take the ratio between inlet air pressure and the exhaust gas pressure and the result is used to determine the net thrust of the engine from prepared tables.

However, it is found that the same pressure ratio is not consistently correlated to engine net thrust with mixer-type nozzle turbofans. This is due to manufacturing variations (tolerated to minimize the production cost) in mixer dimensions from engine to engine that substantially affect the relationship or correlation between such pressure ratio and net thrust.

The consequent potential for a range of error in the indicated thrust meant that jet aircraft with such engines would have had to be underrated on certificaton, denying them access to certain airports and the license to carry loads as heavy as they are actually powered to carry. Accordingly, an object hereof is to provide consistently accurate thrust determining measurement apparatus for such turbofan jet engines, and more particularly to provide improvements that may be readily and inexpensively adapted to existing aircraft that would have heretofore been underrated. More specifically, it is an object to provide a means for so deriving and combining engine gas pressures that the resultant may be applied directly to operate existing pressure sensitive electrical computing indicator devices already furnished with existing aircraft, and of making the adaption with minimal cost and with consistently accurate results.

BRIEF DESCRIPTION OF INVENTION

These objects are achieved in accordance with this invention through recognition that tolerated manufacturing dimensional variations in nozzle dimensions impairing consistent thrust measurement accuracy when using the former technique, have substantially no adverse affect when an engine equivalent exhaust pressure (for being ratioed with the engine inlet pressure) is synthesized, in a certain weighted average, from turbine and fan pressures tapped upstream of the mixer. Thus the improvements herein provided include tapping the total discharge pressure ($P_{TF}$) from the fan and the total discharge pressure from the turbine ($P_{TP}$), and combining these pressures in a manner that produces an output pressure ($P_{TM}$) having a predetermined weighted average for application to one of the two pressure-to-electrical transducing inputs of the ratio-taking EPR computing indicator. The resulting EPR measurement has been found to be consistently and accurately correlated to the level of thrust developed by the engines.

In the currently preferred embodiment the component upstream pressures are combined in a pneumatic computer having a first input connected for receiving gases tapped directly from the turbine discharge at pressure $P_{TP}$ (called the primary exhaust pressure) and a second input for receiving gases tapped directly from the fan discharge at pressure $P_{TF}$. These inputs are combined in a weighting or proportioning system that includes ducts, flowrestricting orifices and bleed vents, dimensioned and arranged to produce a resultant, synthesized gas pressure $P_{TM}$ at an output continuously representing a predetermined weighted average of the two input gas pressures. Such output gas at pressure $P_{TM}$, and inlet air tapped at the intake of the engine, at pressure $P_{T2}$, is then applied to existing ratio-taking, pneumo-electric indicator means to provide the thrust correlated EPR measurement.

These and further features, objects and advantages of the invention will become apparent to those skilled in the art from the following detailed description and appended drawings.

DESCRIPTION OF THE PREFERRED EMBODIMENT

Figure 1:
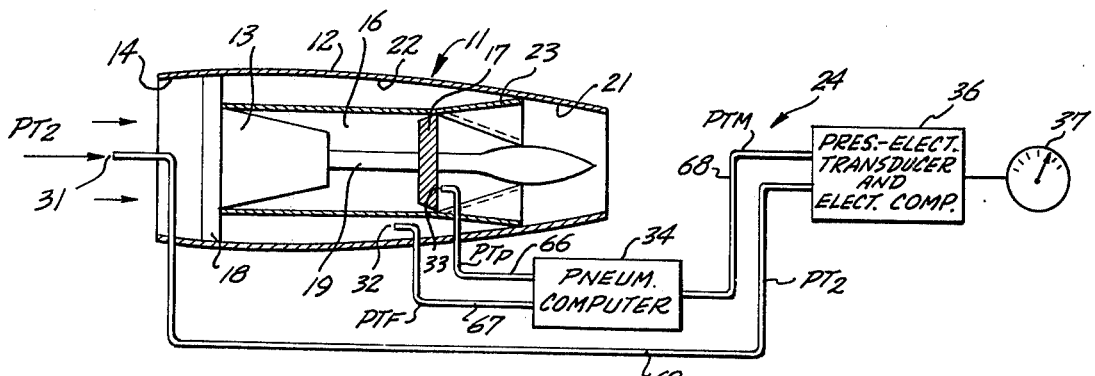
FIG. 1 is a simplified schematic diagram of an engine with thrust measurement apparatus of the present invention.

With reference to FIG. 1, the illustrated turbofan jet engine has an outer cowl 12 which terminates at one end at an inlet 14 and at its opposite end at exhaust nozzle 21. A turbine 17 mounted aft of central combustion chamber 16 turns a central drive shaft 19 that extends forwardly from the turbine to support and drive the rotor of air compressor 13 and that of fan 18. The fan and compressor are both located just inside the air inlet 14, with the compressor discharging compressed intake air into the combustion chamber and with the fan situated in the annular an duct 22 that surrounds the combustion chamber 16. The fan discharge, conveyed aft in duct 22, represents inlet air compressed by the fan and heated by contact with the adjoining combustion chamber wall which it surrounds. This fan discharge mixes with the turbine discharge by their mutual confluence at the rear terminus of an axially oriented lobe-type exhaust mixer 23 such as disclosed in U.S. Pat. No. 3,655,009 issued to Jack H. Hilbig on Apr. 11, 1972, the description in which it is expressly incorporated herein by reference. Briefly, mixer 23 is formed of a ring of sheet metal coaxially disposed about a faired plug concentric with nozzle 21, where the sheet metal ring has a circular forward edge circumferentially affixed to a rear casing of turbine 17 and has cicumferential convolutions or lobes that increase in radial dimension toward the rear of the nozzle so as to direct the turbine discharge rearwardly and radially outwardly and to direct the fan discharge rearwardly and radially inwardly. The discharges so directed, merge and mix at a mixing plane at the rear terminus of mixer 23.

To measure and display the net thrust produced by engine 11, the instrumentation 24 includes pressure tapping ports 31, 32 and 33 that are mounted in such locations that they respectively bleed off fan discharge air and turbine discharge gas for being ducted to the measuring instrumentation. The latter includes a pneumatic computer unit 34 that has two inputs receptive to the pressures developed at the fan and turbine discharge tapping ports 32 and 33 respectively. These pressures are combined in unit 34 to yield an output pressure, as later described, that represents a predetermined weighted average thereof, and which is conducted to one input of a pressure-to-electrical transducing and ratio-taking indicator unit 36. Air at the engine inlet, tapped by port 31, is conducted to another input of unit 36. In response to its two input pressures unit 36 develops electrical signals of related values, computes the ratio of those signals and applies the resultant to indicator 37 as the EPR measurement.

Figure 3:
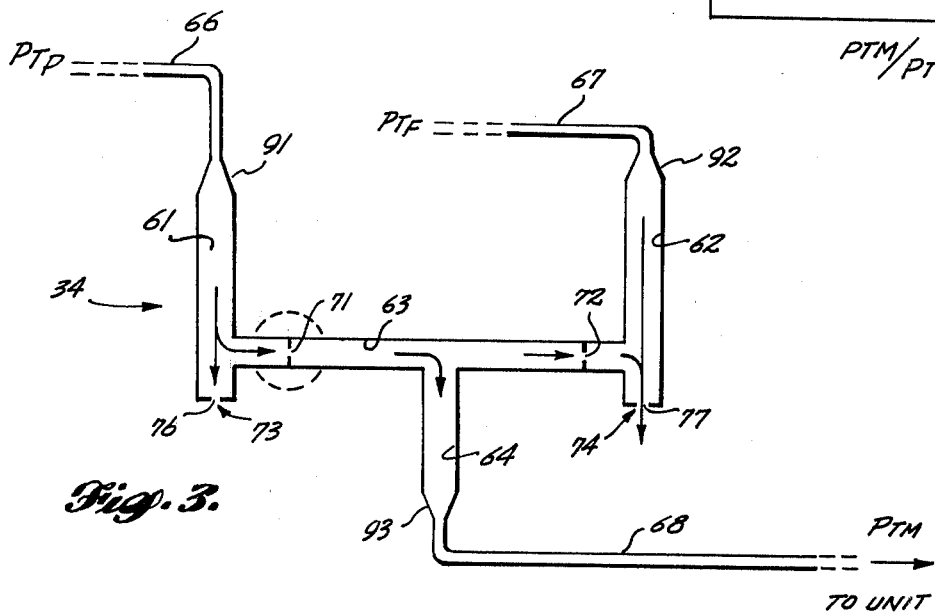
FIG. 3 is a simplified illustration of the pneumatic computer utilized in the method and apparatus of FIG. 1.

As shown in FIG. 3, gas at fan discharge pressure ($P_{TF}$) conducted through pneumatic line 67 enters computer duct 62 at an input 92 disposed at one end of duct 62. Similarly, turbine discharge gas conducted from tapping port 33 by pneumatic line 66 enters computer duct 61 through at input 91 at one end of duct 61. An interconnecting duct 63 forms T junctions with each of ducts 61 and 62 and forms a third T junction intermdiate ducts 61 and 62, with a computer output pressure duct 64. The latter has an outlet 93 coupled to pneumatic line 68 for conducting gas at computer output pressure to computing indicator unit 36, where the output pressure is dead-ended at a pneumo-electric transducer.

Disposed in the duct 63 between inlet duct 61 and outlet duct 64 is a calibrated serial flow-restricting orifice 71. A similar orifice 72 is likewise disposed (in some designs it may be omitted) in duct 63 between inlet duct 62 and outlet duct 64. Calibrated bleed orifices 76 and 77, venting to atmosphere, are provided in the T junction stubs of ducts 61 and 62 respectively. The serial flow-restriction orifices 71, 72 and bleed orifices are sized relatively such that the output pressure in duct 64 is caused to assume a weighted average value intermediate that of the fan and turbine discharge input pressures. The intermdiate or averaged value is so weighted as to represent the summation of contributions in the EPR ratio formula, so that the resulting EPR measurement bears a consistently accurate correlation to thrust. The thrust level itself is determined by an additional calculation usually performed by consulting prepared tables, in which the EPR value is a principal thrust determining factor.

The required weighting that governs computer orifice design choices depend on the design of the particular engine. The best known procedure is to run a test engine in a calibration test bed, and measure $P_{TP}$, $P_{TF}$, $P_{T2}$ and thrust and from these values empirically establish an equation for $P_{TM}$ as a function of weighted values of $P_{TF}$ and $P_{TP}$ that when ratioed with $P_{T2}$, gives an EPR correlated to measured thrust. By way of example, a weighting formula: $P_{TM} = 0.555P_{TP} + 0.444P_{TF}$ has been found satisfactory for a turbofan engine model No. JT8D, manufactured by Pratt and Whitney and equipped with an exhaust mixer of the type described, where $P_{TM}$ is the computer pressure, $P_{TP}$ the turbine discharge pressure and $P_{TF}$ the fan discharge pressure. A pneumatic computer 34 adapted for this particular engine utilized the following exemplary round orifice diameters: 0.081 inch for orifice 71; 0.116 inch for orifice 72; 0.129 inch for orifice 76; and 0.074 inch for orifice 77, with the inside diameter of the various ducts being sufficiently larger than that of the orifice dimensions such that the orifices predominantly determine the degree of flow restriction. It is desirable that bleed orifices 76 and 77 be made sufficiently large that the time constant or response quickness of the computing device permit it to follow sudden changes in engine pressure conditions.

Figure 4:
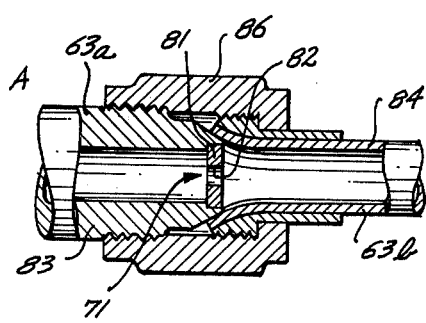
FIG. 4 is an axial, sectional detail of a flow restricting orifice utilized in the pneumatic computer shown in FIG. 3.

Each of the orifices may be constructed as shown in FIG. 4. In this case orifice 71 comprises a round aperture 82 of selected diameter in the center of disk 81. This orifice disk is held removably in duct 63 by segmenting the duct and joining the segments 63a and 63b by a disconnectable coupling in which the orifice disk is clamped. An internally threaded female collar 86 retained on duct segment 63b threadedly engages matching threads on the end of duct segment 63a. When the collar fitting 86 is tightened, the outer margin of disk 81 is clamped and sealed against the flared end of duct section 63b by the abutting end shoulder of duct section 63a.

In the case of the aforementioned Pratt and Whitney engine model No. JT8D, the tapping ports 31 and 33 are provided by existing rake manifolds connected to radially and circumferentially spaced apart ports disposed within cowling 12 at the intake and turbine exhaust section respectively. For ports 32, this same engine may be ordered equipped with a fan pressure rake manifold, heretofore used only on engines supplied for calibration purposes. In particular the fan exhaust pressure, $P_{TF}$, is developed by the $P_{TF7}$ rake manifold of the aforementioned Pratt and Whitney engine while the turbine exhaust pressure, $P_{TP}$ is developed by the $P_{TP7}$ rake manifold.

Unit 36 may be provided by an EPR transmitter manufactured by Honeywell Controls, of Hopkins, Minnesota, designated as Model LG14C14.

Figure 2:
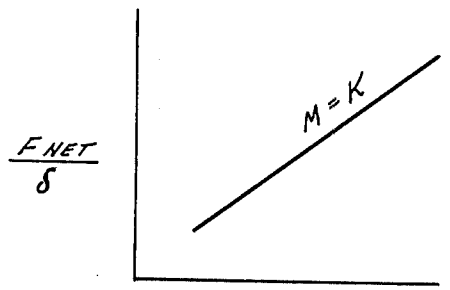
FIG. 2 is a graph showing the relationship between the net thrust $F_{net/f}$ of the engine and the EPR of the synthesized (weighted average) exhaust pressure $P_{TM}$ and the engine intake air pressure $P_{T2}$.

As shown in the graph of FIG. 2, an accurate proportionality or correlation exists between the actual net thrust, represented as $F_{net}/f$ ($f$ = ambient pressure divided by 14.69 psi), and the measured EPR consisting of the ratio of the pneumatically computed pressure factor $P_{TM}$ and the directly measured intake pressure $P_{T2}$ for a given Mach number. As the speed (Mach number) varies, the EPR must be multiplied by a different factor to obtain the net thrust, and as discussed above this calculation is usually performed with prepared tables. Accuracy within a few percentage points has been obtained using the embodiment of the invention described herein.

While the invention has been disclosed herein by way of an illustrative embodiment, it will be readily apparent to persons skilled in the art that changes and modifications may be made thereto without departing from the spirit of the invention.

What is claimed is:

1. Apparatus for measuring net thrust of common nozzle mixed-exhaust turbofan jet engines and the like comprising:

separate first and second input means respectively connected to sense engine fan discharge pressure and engine turbine discharge pressure upstream of an exhaust mixer and output means combining sensed turbine discharge pressure with sensed fan discharge pressure to provide an output response representing a predetermined weighted average of said fan and turbine discharge pressures, and engine pressure ratio computing means having a first input connected to said output means to receive said output response and a second input connected to sense engine inlet pressure for computing the ratio between said output response and said engine inlet pressure and for providing an output signal representative of said ratio.

2. The apparatus defined in claim 1, wherein said first and second input means each comprise means for tapping gases in the respective fan and turbine discharges, and wherein said output means comprises pneumatic means for receiving said gases from said means for tapping and for combining said gases to produce a gas at a pressure representing said predetermined weighted average, and a pneumatic line carrying said gas at said pressure representing said predetermined weighted average.

3. The apparatus in claim 2 wherein said pneumatic means comprises ducting that connects said first and second input means together at a junction with said pneumatic line of said output means, and a first calibrated flow restricting orifice serially disposed in said ducting between said first input means and said junction, a first bleed vent disposed in said ducting upstream of said first orifice and having a second calibrated flow restricting orifice serially disposed therein, and a second bleed vent disposed in said ducting between said second input means and said junction and having a third calibrated flow restricting orifice serially disposed therein, such that said predetermined weighted average represented by the pressure of gas in said pneumatic line of said output means is a function of the flow restriction of said first, second and third orifices in said ducting.

4. The apparatus of claim 3, further comprising a fourth calibrated flow restricting orifice serially disposed between said second input means and said junction and downstream of said second bleed vent such that said predetermined weighted average represented by the pressure of gas in said pneumatic line of said output means is a function of the flow restriction of said first, second, third and fourth orifices in said ducting.

5. A thrust correlated EPR measuring apparatus for a common exhaust, turbofan jet engine, said engine of the type including a compressor, a fan, a turbine jointly driving the compressor and fan, and an exhaust mixer arranged to mix the exhausts from the fan and turbine, said apparatus comprising:

a fist gas tapping means disposed upstream of the compressor for tapping engine intake gases having an intake pressure $P_{T2}$;

a second gas tapping means interposed between said turbine and mixer for tapping turbine discharge gases at a turbine discharge pressure $P_{TP}$;

a third gas tapping means interposed between said fan and said mixer for tapping fan discharge gases at a fan discharge pressure $P_{TF}$;

a pneumatic computer means having first and second pneumatic inputs individually connected to said second and third tapping means, said computer means having a pneumatic output responsive to the input gases at pressures $P_{TP}$ and $P_{TF}$ and issuing gases from said output having a pressure $P_{TM}$ equaling a predetermined weighted average of said pressures $P_{TP}$ and $P_{TF}$;

pneumatic to electric transducer means having first and second inputs separately connected to said first gas tapping means and to said computer means output, respectively, said transducer means converting said pressures, $P_{T2}$ and $P_{TM}$, to representative electrical signals; and electrical means responsive to said transducer means for producing a computed electrical signal representing a ratio of the pressures $P_{T2}$ and $P_{TM}$, where such ratio is correlated to the level of thrust developed by the engine.

6. In a method of correlating thrust and engine pressure ratio in a common exhaust, turbofan jet engine of the type equipped with an exhaust mixer, that includes the steps of tapping gases at engine intake pressure, tapping gases at engine exhaust pressure, conducting the gases at the intake and exhaust pressures to a pneumatic to electric transducer for converting the inlet and exhaust pressures to separate representative electrical signals, respectively, and electrically computing a ratio of such pressures that is correlated to the level of thrust developed by the engine, the improvement in the steps of tapping the gases at the engine exhaust pressure and conducting such gases to said transducer, comprising the steps of:

tapping turbine discharge gases at the output of the turbine, upstream from the mixer;

tapping fan discharge gases at the output of the fan, upstream of the mixer;

conducting the tapped turbine and fan discharge gases to a pneumatic computer;

pneumatically synthesizing a representative exhaust pressure by combining the fan and turbine discharge gases to derive a predetermined weighted average of the pressures thereof; and conducting the so combined gases at said representative exhaust pressure to said transducer for computing said ratio.

* * * * *